United States Patent

[11] 3,623,582

[72] Inventors Urs Giger
Solothurn;
Edwin Fernand Jakob-Schild, Grenchen,
both of Switzerland
[21] Appl. No. 2,270
[22] Filed Jan. 12, 1970
[45] Patented Nov. 30, 1971
[73] Assignee Eta A. G. Ebauches-Fabrik
Grenchen, Switzerland
[32] Priority Jan. 16, 1969
[33] Switzerland
[31] 571/69

[54] FREE-WHEEL MECHANISM
4 Claims, 3 Drawing Figs.

[52] U.S. Cl. .................................................. 192/46
[51] Int. Cl. ............................................. F16d 41/18
[50] Field of Search .......................................... 192/41, 46;
151/13, 35, 41

[56] References Cited
UNITED STATES PATENTS
1,660,772 2/1928 Swenson ..................... 151/35

| | | | |
|---|---|---|---|
| 1,717,035 | 6/1929 | Holt .............................. | 151/35 X |
| 2,078,781 | 4/1937 | Sprenger et al. ............... | 192/46 X |
| 2,257,479 | 9/1941 | Olson ........................... | 151/35 X |
| 2,400,818 | 5/1946 | Gallagher ..................... | 192/46 |
| 2,631,446 | 3/1953 | Meyer .......................... | 192/41 X |

FOREIGN PATENTS 1,238,625 7/1960 France ........................ 192/46

*Primary Examiner*— Allan D. Herrmann
*Attorney*— Stevens, Davis, Miller & Mosher

ABSTRACT: A freewheel mechanism with a pair of coaxial wheels and yielding wedging members cooperating with indentations of the wheels and interlocking the latter for rotary motion when the driving wheel moves in one direction, while allowing the driving wheel to rotate alone freely in the reverse direction. The wedging members are themselves rigid and form part of a single punched piece inserted between the wheels on their common arbor and comprising a hub portion and resilient radial arms, each of which connects a wedging member to the hub portion. Each radial arm has built-in torque and is merely subjected to a pull when the wedging member carried thereby transmits a torque from the driving wheel to the driven wheel.

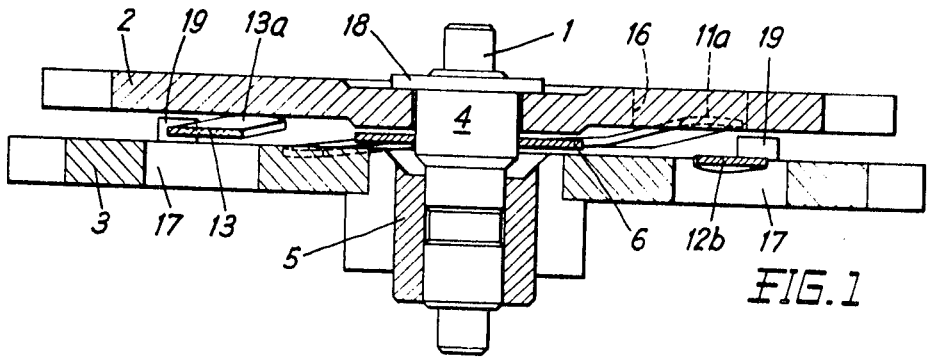
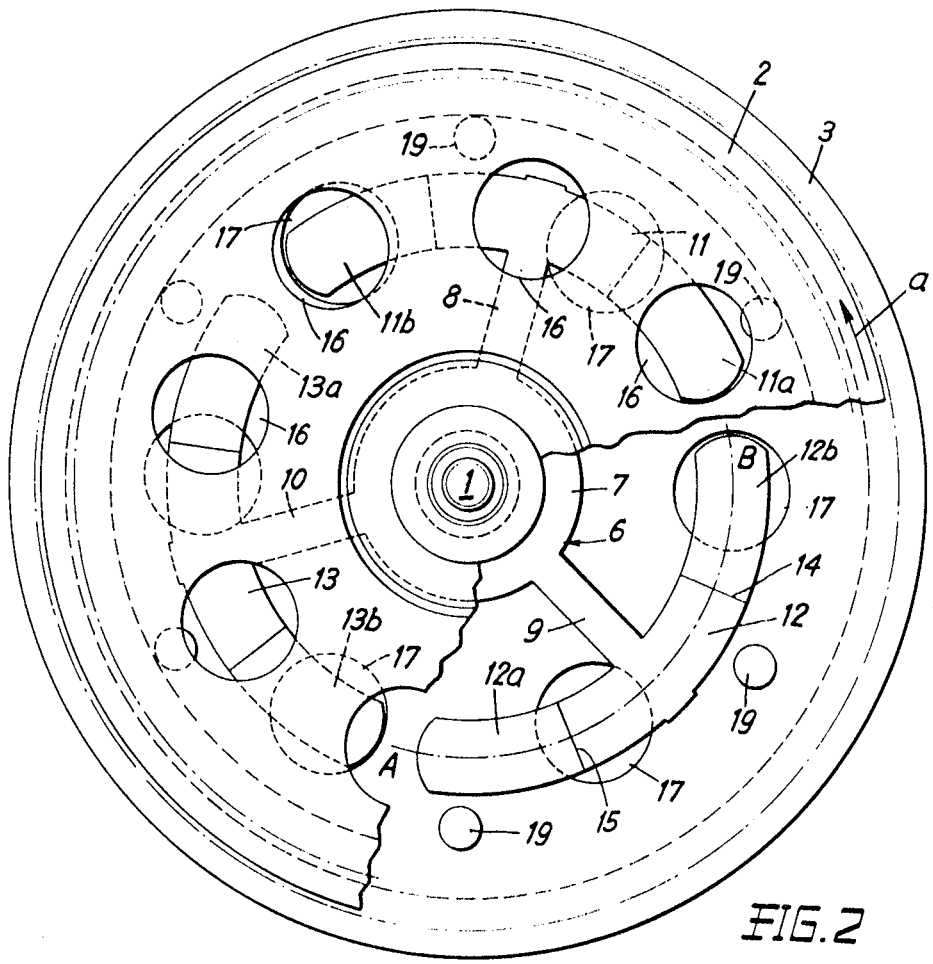
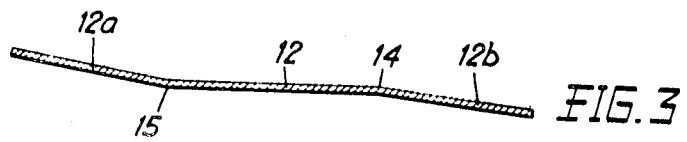

FREE-WHEEL MECHANISM

BACKGROUND OF THE INVENTION

1. Field of the Invention

This invention relates to freewheel mechanisms and, in particular, to freewheel mechanisms comprising a pair of coaxial wheels and at least a wedging member which is arranged between the wheels and interlocks the same for rotary motion when one of them moves in a predetermined direction while allowing said wheel rotating alone freely in the reverse direction, the wedging member then merely jumping over locking means of the wheels provided for cooperation with the wedging member.

2. Description of the Prior Art

The known freewheel mechanisms of the type considered here have, with respect to the freewheel mechanisms of other types, the advantage of the simplicity since their wedging member, which is usually made out of a resilient material, constitutes the sole additional piece appearing between the wheels.

Due to the fact that the wedging members of the known freewheel mechanisms of the type considered are subjected to compression and bending, these wedging members are thus not designed for permitting the driving wheel of the mechanism to transmit a strong torque to the driven wheel. To avoid buckling and quite generally any excessive stress of the wedging members, the latter should be made so strong that they would give raise to an inadmissible friction when the driving wheel rotates in the free direction.

The alternative solution consisting in providing a separate return spring for the wedging member would have the drawback of being more expensive because the wedging member and its return spring should both be made and mounted separately.

There are truly freewheel mechanisms already known in the art with wedging members but which do not comprise any return spring. The operation of the latter is ensured by camming means provided between the locking means of the wheel and causing the wedging members to oscillate when the driving wheel of the mechanism moves in the free direction.

Since each wedging member of the mechanisms of the type considered has to reciprocate at least 10 times during any revolution of the driving wheel in the free direction, it would obviously not be possible to provide journaling means for the wedging members which would be suitable at high speed, i.e., several thousands of revolutions per minute of the driving wheel in the free direction.

It has thus heretofore not been possible to provide a freewheel mechanism as simple as that of the type considered here which would permit the driving wheel of the mechanism both to transmit strong torques to the driven wheel when it moves in one direction and to rotate alone freely at high speed in the reverse direction.

SUMMARY OF THE INVENTION

With the freewheel mechanism according to the invention the side surfaces of the wheels comprise opposite surface portions having the shape of circular crowns and a row of locking means is provided on each wheel within the area of said surface portions. Moreover, the wedging member has an elongated shape and is made rigid; it is oriented in such a manner as to extend between the locking means of the two wheels opposite the same. This wedging member has finally its central portion connected to a resilient radial arm having built-in torque, said radial arm carrying the wedging member and connecting the same to a hub portion freely set on the common arbor of the wheels.

BRIEF DESCRIPTION OF THE DRAWING

One embodiment of the freewheel mechanism according to the invention is represented diagrammatically and by way of example in the accompanying drawing in which:

FIG. 1 is a diametrical sectional view of the mechanism;
FIG. 2 is a plan view, and
FIG. 3 is a cross section along line A-B of FIG. 2.

DESCRIPTION OF THE PREFERRED EMBODIMENT

The freewheel mechanism represented in the drawing is arranged between a pair of coaxial wheels 2, 3 located on a common arbor 1. Whereas wheel 2 is idly set on a portion 4 of arbor 1, wheel 3 is riveted to a pinion 5 which is set with force fit on that arbor.

The operation of the mechanism is ensured by a single punched piece 6 inserted between wheels 2 and 3. Piece 6 comprises a hub portion 7 freely set on portion 4 of arbor 1, three radially extending narrow arms 8, 9, 10 projecting from hub portion 7 and regularly staggered around the axis thereof, and three members 11, 12, 13, each provided at the end of one of the arms 8, 9, 10 and constituting a wedging member of the freewheel mechanism. FIG. 2 shows that the wedging members 11, 12, 13 are arcuate and extend along a circular crown coaxial to hub portion 7. The wedging members 11, 12, 13 are carried by the corresponding arms 8, 9, 10 to which their central portion is connected. The two end portions of each wedging member are bent in opposed direction along edges 14, 15 as shown in FIG. 3. The bent portions of wedging members 11, 12, 13 thus extend on either side of the plane of piece 6. As it may be guessed upon considering FIG. 1, the end portions 11a, 12a, 13a of the wedging members 11, 12, 13 extend in the direction of wheel 2 while the opposed bent end portions 11b, 12b, 13b extend in the direction of the other wheel 3. The end portions 11a, 12a, 13a and 11b, 12b, 13b of the wedging members cooperate with locking means provided on the facing side surfaces of wheels 2, 3, respectively. These locking means which constitute an indentation could consist of a crown toothing provided on each wheel. In the embodiment represented in the drawing the indentations in question have, however, been obtained in a substantially simpler manner. They merely consist of a row of circular cutouts provided in each wheel. These cutouts are regularly staggered around the wheel axis within a surface portion of the wheel having the shape of a circular crown and extending opposite the wedging members 11, 12, 13. For a purpose explained hereinafter the two wheels 2, 3 have not the same number of cutouts. Thus, wheel 2 is provided with eight cutouts 16 while there are only six cutouts 17 in wheel 3.

The distance between wheels 2 and 3 is chosen in such a manner with respect to the inclination of the two end portions of each wedging member that each radial arm 8, 9, 10 will have a built-in torque when the rounded working ends of the wedging member carried thereby bear against the facing side surfaces of wheels 2, 3 and that there will be a remaining torque within said arms at least until one end of the wedging member is fully engaged in a cutout wheel 16 of wheel 2 and the other end of the wedging member is simultaneously fully engaged in a cutout 17 of wheel 3. The sizes of radial arms 8, 9, 10 can without ado be chosen in such a manner that the deformations to which they will have to be subjected due to the above-indicated condition only involve a stress safely ranging within the limits of elasticity.

The pushing action exerted on wheel 2 by arms 8, 9, 10 through wedging members 11, 12, 13 bearing on wheel 3 rigidly connected to arbor 4, causes wheel 2 to bear against a collet 18 of arbor 1. Since the pushing action exerted on wheel 2 by a particular arm 8, 9, 10 is not constant during the operation of the mechanism, wheel 2 may happen to lie in a slightly inclined position with respect to arbor 4. The inclination of wheel 2 is, however, limited by a row of projections 19 provided on wheel 3 so that any jamming between wheel 2 and arbor 1 will be avoided.

The operation of the freewheel mechanism represented in the drawing will now be described while supposing: wheel 2 is the driving wheel and moves in the direction of arrow $a$; wheel 3 is at rest; none of the end portions of the wedging members engages a cutout 16, 17.

According to the frictional conditions of the rounded ends of the wedging members over wheels 2, 3, there are two cases to be considered. Piece 6 can either remain at rest with wheel 3 or rotate with wheel 2. In the first instance, wheel 2 will rotate with respect to piece 6 until one end 11a, 12a, or 13a enters a cutout 16. Due to the number of cutouts 16 it will appear that only one end of the series a of the wedging members can enter at once at cutout 16. As soon as the rounded end of that wedging member is caught by the edge of cutout 16 (see end 11a in FIG. 2), piece 6 will be driven by wheel 2. In order to ensure a proper driving of piece 6 the radius of curvature of the end portions of wedging members 11, 12, 13 is made somewhat smaller than the radius of the cutouts 16, 17. Soon after having begun to move together with wheel 2, piece 6 will cause the end portions 11b, 12b, 13b of the wedging members to enter three cutouts 17 of wheel 3 staggered at 120° from each other. The wedging member, the opposed end of which has been caught by a cutout 16 of wheel 2, then reaches its working position and drives wheel 3. Wheels 2 and 3 are then interlocked and they rotate further as a single unit. In the second instance wheel 2 will drive piece 6 from the starting position considered hereabove at first until the ends 11b, 12b, 13b of the wedging members will reach the relative position represented in FIG. 2 with respect to wheel 3. Piece 6 will then remain at rest with wheel 3 until wheel 2 will have moved to such an extent that one of the other end portions 11a, 12a, 13a of the wedging members enters a cutout 16 of wheel 2. The corresponding wedging member then will come in working position as in the first instance described hereabove.

With respect to a mechanism in which both wheels would be provided with the same number of cutouts, the mechanism represented in the drawing has the advantage that the dead motion i.e. the angle through which the driving wheel has at most to rotate with respect to the driven wheel in the direction opposed to the free direction is reduced to a third. To obtain that result the numbers of cutouts in both wheels need not merely be different. One of these two numbers at least shall moreover not be a multiple of three, more exactly of the number of wedging members.

When wheel 2 rotates in the direction opposite to arrow a, the edges of cutouts 16 merely slide over the working ends 11a, 12a, 13a of the wedging members without any action on wheel 3 which can accordingly remain at rest. If wheel 2 rotates at high speed in that free direction, the end portions 11a, 12a, 13a of the wedging members no longer enter the corresponding cutouts because of the inertia of the wedging members so that the single losses due to the structure of the mechanism represented will be due to the frictional engagement of the rounded ends of the wedging members over the corresponding surfaces of the wheels.

As shown in FIG. 2, the wedging members 12 and 13 are inoperative when wedging member 11 is in working position. The action of the driving wheel 2 on end 11a and the reaction of the driven wheel 3 on the opposed end 11b have, of course, the same strength. The resultant of that action and reaction is directed along the radius of the wheels defined by arm 8. In addition to the built-in torque, this arm 8 is accordingly only subjected to a pull when wheel 2 drives wheel 3.

In the mechanism described, the wedging members 11, 12, 13 are the only portions of piece 6 which can be submitted to a compression and a bending stress. The sizes of these wedging members need therefore only be chosen in such a manner that the wedging members operate as rigid body members. The yielding action required by the operation of the mechanism is exclusively ensured by the radial arms 8, 9, 10. Since the torque transmitted by wheel 2 to wheel 3 has not any other effect as to cause these radial arms to be pulled, the latter can be made with relatively reduced sizes. The built-in torque of these radial arms can accordingly be reduced to the desired extent so that the friction between the wedging members and wheels 2, 3, when the latter rotate in the free direction with respect to each other, will also be very small.

The described freewheel mechanism is particularly suitable for use in a bidirectional input unidirectional output mechanism of a self-winding watch.

What is claimed is:

1. A freewheel mechanism comprising, in combination, an arbor, a hub portion loosely set on said arbor, a pair of coaxial wheels on said arbor, located on either side of said hub portion, the facing side surfaces of said wheels having opposite working portions in the form of circular crowns, a row of locking means provided on each one of said wheels within said working portion thereof, an elongated rigid wedging member yieldingly arranged between said wheels and being oriented so as to extend over its whole length opposite the rows of locking means provided on said wheels, and a radial resilient arm having built-in torque and carrying said wedging member, said arm extending from said hub portion to a point of said wedging member being equidistant from the two ends thereof, said wedging member cooperating with said locking means under the action of the torque of said radial arm so as to interlock said wheels when one of them rotates in a predetermined direction and to slide over said locking means when said one wheel rotates in the reverse direction.

2. The freewheel mechanism as claimed in claim 1, wherein said locking means consist of cutouts provided in each one of said wheels and regularly staggered around the axis thereof, said cutouts being circular and said wedging member being arcuate, its two ends being rounded and having a radius of curvature at most equal to the radius of said cutouts.

3. The freewheel mechanism as claimed in claim 1, wherein said locking means consist of cutouts provided in each one of said wheels and regularly staggered around the axis thereof and further comprising a plurality of similar wedging members, the two wheels having different numbers of cutouts, at most one of these numbers being divisible by the number of wedging members.

4. The freewheel mechanism as claimed in claim 1, wherein said locking means consist of cutouts provided in each one of said wheels and regularly staggered around the axis thereof and wherein said wedging member, said radial resilient arm carrying the wedging member and said hub portion from which said radial arm projects form parts of a single punched piece, the two end portions of said wedging member being bent in opposed direction out of the plane of said punched piece so as to extend on either side of said plane.

* * * * *